United States Patent [19]

Abiven et al.

[11] Patent Number: 5,043,976
[45] Date of Patent: Aug. 27, 1991

[54] LOOP-BACK DEVICE FOR HALF-DUPLEX OPTICAL TRANSMISSION SYSTEM

[75] Inventors: Jacques Abiven, Plouaret; Alain Rebours, Lannion, both of France

[73] Assignee: Minister of the Post Telecommunications and Space (Centre national d'Etudes des Télècommunications), Issy-les-Moulineaux, France

[21] Appl. No.: 573,979

[22] Filed: Aug. 28, 1990

[30] Foreign Application Priority Data

Aug. 31, 1989 [FR] France .................... 89 11444

[51] Int. Cl.⁵ .................... H04J 3/00; H04B 10/00
[52] U.S. Cl. .................... 359/110; 370/6; 370/15; 370/32.1; 379/410; 359/113; 385/15
[58] Field of Search .................... 370/4, 6, 15, 32.1; 455/601, 602, 606, 612, 617; 350/96.15; 379/5, 406, 410

[56] References Cited

U.S. PATENT DOCUMENTS 4,450,555 5/1984 Pays .................... 370/6
4,829,512 5/1989 Nakai et al. .................... 370/4

FOREIGN PATENT DOCUMENTS 0171138 10/1983 Japan .................... 370/6

Primary Examiner—Reinhard J. Eisenzopf
Assistant Examiner—Kinfe-Michael Negash
Attorney, Agent, or Firm—Fleit, Jacobson, Cohn, Price, Holman & Stern

[57] ABSTRACT

A loop-back device is particularly designed to fit line terminals in half-duplex optical transmission systems thereby facilitating fault location in these transmission systems. An optical fiber coupler having a high cross-talk generates an echo in a reception channel of the terminal, from a test signal transmitted in a transmission channel of the terminal, to an optical transmission medium. Means are provided for cancelling transmission of the echo in the reception channel when the loop-back is de-activated, i.e. when a data signal is carried in the transmission medium, and for amplifying and regenerating said echo when the loop-back is activated, i.e. when said test signal is transmitted. A memory is used for delaying the echo and for transmitting it to a receiving circuit in the terminal during a signal reception period of the half-duplex transmission.

3 Claims, 2 Drawing Sheets

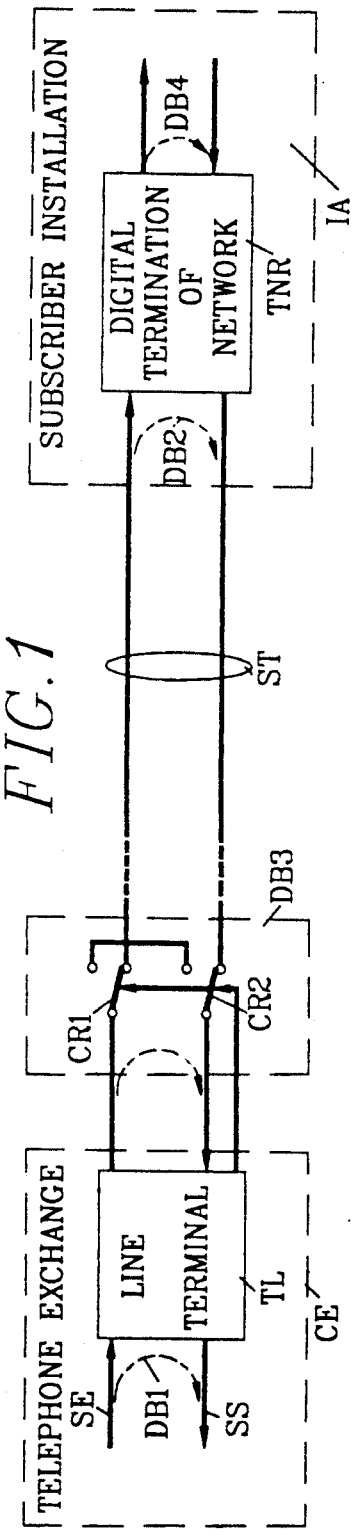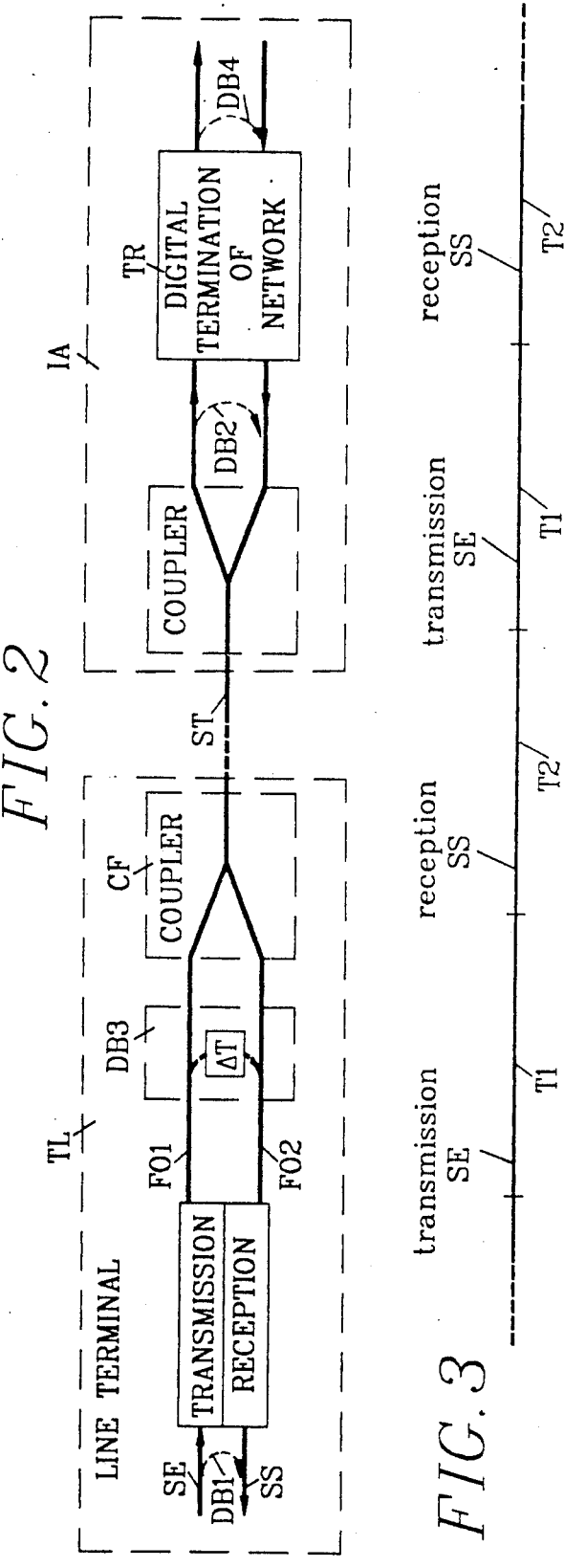

LOOP-BACK DEVICE FOR HALF-DUPLEX OPTICAL TRANSMISSION SYSTEM

BACKGROUND OF THE INVENTION

1. Field of the Invention

This invention relates in a general manner to the field of fault location in signal transmission systems. More particularly, the invention relates to loop-back devices for fault locating in line equipments included in half-duplex optical transmission systems.

The conventional way to locate operating faults in transmission systems is to selectively set up loop-back paths between inputs and outputs of equipments included in said system. In conventional line terminal equipments connected to metallic-type transmission media, different components are available and can be used, such as e.g. electromagnetic microrelays or switching members in the solid state. In the case of an optical-type equipment, the use of an optical switch would simplify the design of a loop-back device. However, optical switches are only available at present at the laboratory stage and are not marketed.

OBJECT OF THE INVENTION

The main object of this invention is to provide a loop-back device for line equipments in half-duplex optical transmission systems, having relatively simple design and moderate cost and in which optical switches are not used.

SUMMARY OF THE INVENTION

Accordingly, a loop-back device of a line equipment embodying the invention, included in a half-duplex optical transmission system comprises an optical fiber coupler connecting a transmission channel and a reception channel to a single optical transmission medium and having high cross talk between ports connected to the channels for producing an echo signal into the reception channel from a test signal transmitted in the transmission channel during transmission periods of the half-duplex transmission, means for cancelling the transmission of the echo signal in the reception channel when a data signal is to be transmitted in the transmission medium and for amplifying and regenerating said echo signal into an amplified echo signal when the test signal is to be transmitted in the transmission channel, and means for delaying the amplified echo signal thereby transmitting it to receiving means in the equipment during signal reception periods of the half-duplex transmission.

BRIEF DESCRIPTION OF THE DRAWINGS

Further features and advantages of the invention will be apparent from the following particular description of several preferred embodiments of this invention as illustrated in the corresponding accompanying drawings in which:

FIG. 1 schematically shows a signal transmission system of the bidirectional type and with a double transmission medium;

FIG. 2 schematically shows an optical transmission system of the half-duplex bidirectional type on a single optical fiber;

FIG. 3 shows the alternation of transmission and reception periods in a half-duplex transmission system.

DESCRIPTION OF THE PREFERRED EMBODIMENTS

Figure 4:
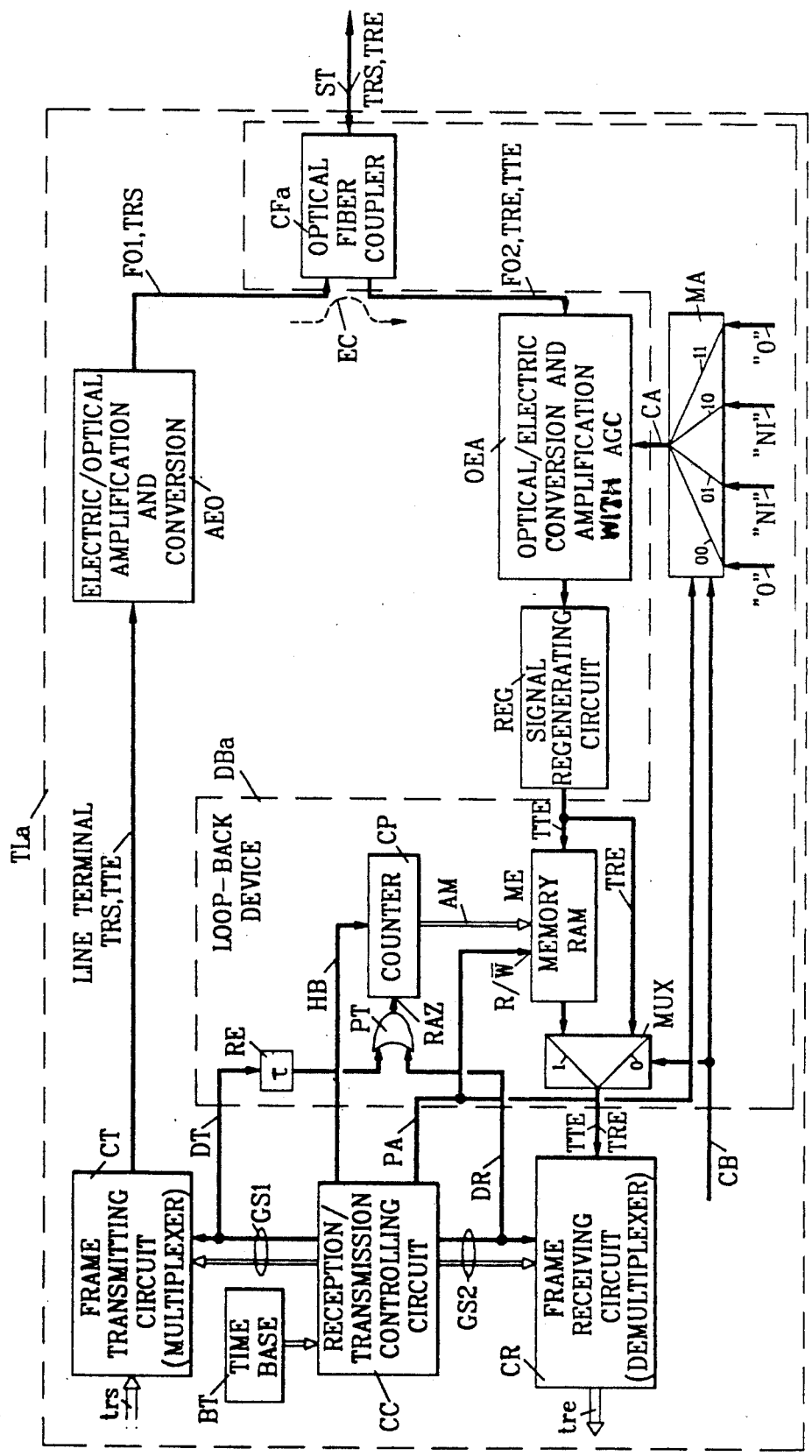
FIG. 4 is a block-diagram of a line terminal fitted with a loop-back device embodying the invention.

In reference to FIG. 1, the locating of operating faults in a transmission system conventionally uses loop-back paths at input and output of equipments. If we thus consider e.g. a bidirectional transmission via a double medium ST connecting a line terminal TL of a telephone exchange CE to a digital termination of network TNR in a subscriber installation IA, four loop-back devices DB1, DB2 and DB3, DB4 are usually provided respectively at input and output of the line terminal TL and of the digital termination of network TNR. In order to carry out a loop-back test from the telephone exchange CE, a loop-back test signal SE is transmitted in the direction TL→TNR. A first loop-back path is firstly carried out within the device DB3, then second and third loop-back paths are respectively carried out within the devices DB2 and DB4. The test signal SE and a return signal SS supplied to the line terminal TL via the loop-back path are compared. A fault, if any, is located in the line terminal TL or in the transmission medium ST or in the digital termination of network TNR. The loop-back operations are remote controlled e.g. by given code words that are transmitted from the line terminal TL and that are decoded in the line terminal TL and in the digital termination of network TNR. In the case of a transmission medium ST of the metallic type, the loop-back devices DB1 to DB4 are easily embodied. As shown in FIG. 1, in the loop-back device DB3, relay contacts CR1 and CR2 can be used.

In the case of a double transmission medium ST of the optical fiber type, optical switches could be used. However, optical switches are still only at the laboratory stage and are not marketed. A loop-back operation without recourse to optical switches in a transmission system such as shown in FIG. 1 and in which an optical fiber is used for each transmission direction requires means that are relatively complex and expensive given the function to be carried out. In brief, optical couplers and adequate electronic means would be necessary.

In reference to FIG. 2, the carrying out of a loop-back path in a half-duplex optical transmission system poses additional problems. In fact, in this case it is necessary to manage the signal transmission instants very precisely in such a way as to make them coincide with corresponding transmission periods. A delay ΔT having a duration equal to the duration of a transmission period T1, T2 must be introduced in order to make the transmission of the return signal SS coincide with a transmission period T2 during which the line terminal TL is in a reception phase (FIG. 3).

A solution that compels recognition is the solution shown in FIG. 2 and consists in placing the coupling device, e.g. DB3, where there is a link with two optical fibers, FO1 and FO2, between the line terminal TL and an optical fiber coupler CF of the 2→1 type, the loop-back device being constituted by an optical switch and delaying means. In a half-duplex optical transmission system, the optical fiber couplers CF that are used are usually low-crosstalk couplers so as to minimize near echo and so as not to disturb the receiving circuits. Contrary to this conventional disposition, the loop-back device embodying the invention requires the use of an optical fiber coupler having a high crosstalk.

In reference to FIG. 4, e.g a line terminal TLa is now considered and is fitted with a loop-back device DBa embodying the invention. In addition to the loop-back device DBa, the line terminal TLa comprises a frame transmitting circuit CT and a frame receiving circuit CR, a time base BT, a reception/transmission controlling circuit CC, electric/ optical amplification and conversion means AEo, and optical/electric conversion and amplification means OEA with automatic gain control (AGC).

The frame transmitting circuit CT receives, at input, different frame management and data bits trs in parallel. The bits trs are multiplexed in order to constitute outgoing frames TRS that are fed in serialized form by the frame transmitting circuit CT. The electric signals corresponding to the frames TRS are amplified and converted into optical signals by the amplification and conversion means AEO.

A link optical fiber FO1 connects the means AEO to a first port of an optical fiber coupler CFa. Conventionally, the first purpose of the coupler CFa is to connect the optical transmission medium ST to the transmission channel and to the reception channel in the line terminal TLa. According to the invention, a second purpose of the coupler CFa is to produce an optical echo signal EC of sufficient amplitude. To do so, the coupler CFa is comprised of a high-crosstalk coupler, if necessary specially developed for the loop-back device embodying the invention DBa. The echo signal EC is injected into another link optical fiber FO2 connecting a second port of the coupler CFa to an input of the optical/electric conversion and amplification means OEA with AGc. The level of the echo signal EC must be high, notably in relation to other optical echo signals produced by connections and splices along the transmission medium ST.

An amplifier with AGC included in the means OEA is selectively controlled by a signal CA as a function of periods T1 and T2 of the half-duplex and of the operating state of the terminal TLa. The signal CA is issued by an analog multiplexer MA provided in the loop-back device DBa.

In normal frame transmission/reception operating, the signal cA is at a level "0" during the transmission periods T1 and at a level "NI" during the reception periods T2. The signal CA = "0" de-activates the amplifier OEA during the periods T1 and the echo signal EC generated by the outgoing frames TRS is stopped within said amplifier and is not transmitted to the frame receiving circuit CR. The signal CA = "NI" activates the amplifier OEA during the periods T2, and incoming frames TRE carried by the transmission medium ST are transmitted to the frame receiving circuit CR. The frame receiving circuit CR demultiplexes the incoming frames TRE and supplies them in the form of parallel bits tre.

In loop-back operating, the signal CA is at a level "NI" during the transmission periods T1 and at a level "0" during the reception periods T2. Test outgoing frames TRS=TTE are transmitted during the periods T1, and the corresponding echo signal EC is transmitted via the amplifier OEA to the frame receiving circuit CR. During the periods T2, the amplifier OEA is deactivated and any signal coming from the transmission medium ST is stopped within said amplifier and is not transmitted to the circuit CR.

In addition to the coupler CFa which through its second purpose is an integral part of the loop-back device embodying the invention DBa, the device DBa comprises the analog multiplexer MA, a RAM-type memory ME, a logic multiplexer MUX, a binary counter CP, an OR-type logic gate PT and a delaying circuit RE.

The purpose of the analog multiplexer MA is to produce the signal CA from d.c. voltage levels "0" and "NI" respectively applied to first, fourth and second, third inputs of the multiplexer MA. Two switching control inputs to multiplexer MA receive a logical half-duplex period signal PA and a logical loop-back control signal CB. The combinations "00" and "10" of the signals PA and CB correspond to the normal frame transmission/reception operating and select the levels "0" and "NI" during the periods T1 and T2 respectively. The combinations "01" and "11" of the signals PA and CB correspond to loop-back operating and select the levels "NI" and "0" during the periods T1 and T2 respectively. The levels "0" and "NI" of the signal CA correspond to signal levels desired at output of the means OEA. In the means OEA, the signal CA is compared to the level of the actual signal at output of the means OEA and an error signal acts on a gain control of the amplifier with AGC. The signal level outgoing from the means OEA is thus maintained constant despite an important difference in levels between the signals EC and TRE.

The RAM memory ME has a data input connected via a signal regenerating circuit REG to an output of the optical/electric conversion and amplification means OEA with ACC. The circuit REG reshapes the frame signals transmitted by the means OEA and particularly the signals relating to the echo EC produced by the test frames TTE. The incoming frames TRE are transmitted directly to a first input of the multiplexer MUX. The test frames TTE are written in the memory ME during the transmission periods T1 so as to be delayed until the reception periods T2 during which the test frames are read in the memory ME and transmitted via the multiplexer MUX to the frame receiving circuit CR. The test frames TTE read in the memory ME are applied to a second input of the multiplexer MUX. The first and second inputs of the multiplexer MUX are respectively selected by states "0" and "1" of the loop-back control signal CB. The memory ME has typically a capacity of 1024 bits so as to memorize test frames TTE of length equal to 1024 bits.

The purpose of the members CP, PT and RE is to adequately control the writing and reading of the test frames TTE in the memory ME. Typically, the binary counter CP is a modulo-1024 counter and its counting capacity therefore corresponds to the length of the frames. The same counter CP is used for write and read addressing of the memory ME. The counter CP supplies addresses AM at output which are applied to corresponding addressing inputs of the memory ME. Each cell of the memory ME memorizes one frame bit. The counter CP is incremented by a bit timing clock HB which is supplied by the reception/transmission controlling circuit CC.

The reception/transmission controlling circuit CC derives two groups of clock and sync signals GS1 and GS2 which are respectively supplied to the frame transmitting circuit CT and to the frame receiving circuit CR. One, DT, of the signals of the group GS1 is a pulse in the state "1" which indicates the start of the transmission of a frame TRS, TTE from the circuit CT, during a transmission period T1. One, DR, of the signals of the group GS2 is a pulse in the state "1" which indicates the start of the reception of an incoming frame TRE in the circuit CR, during a reception period T2. The pulse DT is applied to a first input of the gate PT via the delaying circuit RE. The pulse DR is applied directly to a second input of the gate PT. An output of the gate PT is connected to a resetting control input RAZ of the counter CP.

After looping of the line terminal TLa, the start of the transmission of a test frame TTE during a transmission period T1 coincides with the pulse DT in the state "1". The pulse DT is delayed by the circuit RE by a duration $\tau$ corresponding to a signal transmission time between the output of the frame transmitting circuit CT and the data input of the RAM memory ME. The pulse DT applied to the input RAZ of the counter CP, via the gate PT, controls the resetting and initiating at zero of the counter CP in synchronism with the arrival of the beginning of the frame TTE on the data input of the memory ME. The signal PA is applied to a read/write control input R/$\overline{W}$ of the memory ME. During the period T1, the signal PA is in the state "0" and the memory ME is selected for writing. The counter CP is cyclically incremented from the address AM="0" to the address AM="1023" as the frame bits in the test frame TTE arrive. When the counter CP reaches the maximum value 1023, the entire frame TTE is loaded in the memory ME and the counter CP blocks itself.

The pulse DR="1" intervenes at the start of the reception period T2 and signals that the frame receiving circuit CR is ready to receive a frame. The pulse DR="1" reset the counter CP and initiates it at zero. During the period T2, the signal PA is in the state "1" and the memory ME is selected for reading. The counter CP cyclically issues the addresses from AM="0" to AM="1023", and the bits of the frame TTE are successively transmitted to the frame receiving circuit CR via the multiplexer MUX. When the counter CP reaches the maximum value 1023, the test frame TTE has been entirely transmitted to the circuit CR and the counter CP blocks itself until reception of a new frame TTE.

What we claim is:

1. A loop-back device in a line equipment included in an optical half-duplex transmission system, said device comprising an optical fiber coupler connecting a transmission channel and a reception channel to a single optical transmission medium and having high crosstalk between ports connected to said channels for producing an echo signal into said reception channel from a test signal transmitted in said transmission channel during transmission periods of the half-duplex transmission, means for cancelling the transmission of said echo signal in said reception channel when a data signal is to be transmitted in said transmission medium and for amplifying and regenerating said echo signal into an amplified echo signal when said test signal is to be transmitted in said transmission channel, and means for delaying said amplified echo signal thereby transmitting it to receiving means in said equipment during signal reception periods of said half-duplex transmission.

2. The loop-back device as claimed in claim 1, wherein said cancelling, amplifying and regenerating means comprise an automatic gain control amplifier connected to said reception channel, and gain control means for de-activating said amplifier during signal transmission periods of said half-duplex transmission when said data signal is transmitted and for activating said amplifier during said transmission periods when said test signal is transmitted.

3. The loop-back device claimed in claim 1, wherein said delaying means comprise a RAM memory, and write/read control means for controlling the writing and reading of said amplified echo signal in said memory in synchronism respectively with said transmission periods and said reception periods of said half-duplex transmission.

* * * * *